(12) United States Patent
Johnson

(10) Patent No.: US 6,539,411 B1
(45) Date of Patent: Mar. 25, 2003

(54) DIRECT DIGITAL SYNTHESIZER

(75) Inventor: Robert Everest Johnson, Morris, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/181,815

(22) Filed: Oct. 29, 1998

(51) Int. Cl.[7] .................................................. G06F 1/02
(52) U.S. Cl. ........................................ 708/271; 708/272
(58) Field of Search ................................ 708/271–272; 327/106–107

(56) References Cited

U.S. PATENT DOCUMENTS

| | | | |
|---|---|---|---|
| 5,019,825 A | | 5/1991 | McCorkle |
| 5,028,887 A | | 7/1991 | Gilmore |
| 5,554,987 A | * | 9/1996 | Ooga ........................... 327/107 |
| 5,963,607 A | * | 10/1999 | Romano et al. ............ 327/106 |
| 6,066,967 A | * | 5/2000 | Cahill et al. ................. 708/271 |

FOREIGN PATENT DOCUMENTS

| | | |
|---|---|---|
| CN | 338862 | 8/1998 |
| JP | 51 105259 | 9/1976 |
| JP | 58 005874 | 1/1983 |
| JP | 1 207811 | 8/1989 |
| JP | 7 030330 | 10/1995 |
| JP | 9 205327 | 5/1997 |

OTHER PUBLICATIONS

JPO Office Action, Synopsis of relevance JP Application 51–105259 Abstract.
Japanese Office Action; Examiner: M. Kobayashi; Patent Application No. 307917/1999; Dec. 11, 2001.
Canadian Office Action, Examiner: Andrew O'Malley; Application No. 2,281,407, Dec. 19, 2001.
"CMOS, 125 MHz Complete DDS Synthesizer", *Analog Devices 9850*, 1997; pp. 1–19.

* cited by examiner

*Primary Examiner*—Tan V. Mai
(74) *Attorney, Agent, or Firm*—Harness, Dickey & Pierce, P.L.C.

(57) ABSTRACT

A digital synthesizer includes a memory containing values representing amplitudes of a signal such as a sinewave, a digital/analog converter for converting outputs from the memory into an analog signal, and a counter for counting by a predetermined fixed increment, which operates at a high frequency to enable the generation of very precise frequency waveforms. The digital synthesizer has many practical applications including the generation of precise signals to extract information from input radio frequency signals, the obtaining of a precise frequency from a low-cost clock, and the use as a component of a FSK modulator to permit selection between signals of multiple frequencies without any phase discontinuity. Finally, the digital synthesizer can be used in combination with an 8-bit memory, to generate a 10-bit input to a digital-to-analog converter.

29 Claims, 5 Drawing Sheets

DIRECT DIGITAL SYNTHESIZER

BACKGROUND OF THE INVENTION

1. Field of the Invention

The present invention relates to an improved direct digital synthesizer.

2. Description of the Related Art

Direct digital synthesis (DDS) is an electronic circuit technique used to generate periodic waveforms. A direct digital synthesizer generates a stream of digital data which is transformed into an analog waveform with a digital-to-analog converter (DAC). A direct digital synthesizer operates by clocking a binary accumulator (typically greater than or equal to 24 bits) at a high frequency (for example, >100 Mhz).

The accumulator is essentially an adder circuit with one input and one output. At every clock signal, the input value is added to the current output value and the output of the accumulator assumes a new sum. The input, usually referred to as a control word, specifies the magnitude of the count increment. If the control word is 250, the accumulator will count in a 0, 250, 500, 750, 1000 . . . sequence until it rolls over and continues.

A known direct digital synthesizer 1 is shown in FIG. 1. A value "N", which is essentially a variable control word, is loaded into a control register 2 from a microprocessor ($\mu$P) 3. The control word, with a variable value "N" such as 250 for example, is then input to an accumulator 4. The accumulator 4 adds a present count value A to a previous count value B, and outputs the combined count or output sum to a lookup table 6. The lookup table 6 then provides an output to a digital-to-analog converter (DAC) 8. The operation of this direct digital synthesizer 1 is described as follows.

The lookup table 6, which receives an accumulated output consisting of the count value A and the previous count value B, stores values representing amplitudes of the synthesized signal, which can be a sine wave signal, for example. As the accumulator 4 steps through its counting range, the lookup table 6 outputs a digital representation of a sine wave, for example or other waveform shape. The output from lookup table 6 is then input to DAC 8. The DAC 8 outputs an analog waveform at a frequency established by the magnitude of the control word divided by the maximum count of accumulator 4 (for example $2^{24}$ for a 24-bit counter, multiplied by the clock frequency). Accordingly, if the control word "N" has a value of 250, and the clock rate of 60 MHz clocks a 24-bit accumulator 4, the frequency of the output signal will be 894.1 Hz. A control word "N" of 251, produces an output signal at a frequency of 897.6 Hz. Thus, from one high-frequency clock, a direct digital synthesizer 1 generates periodic analog signals of a wide range of precisely controlled frequencies.

Creating an efficient DDS requires balancing conflicting requirements of circuit speed, complexity and function. An accumulator-based DDS provides a general purpose function because it can add any number to its current input. This generality makes the circuit slow and complex. In the past, to raise the frequency of operation in an attempt to extend the range of potential applications of the DDS 1, either pipelined adder circuits were used, or more costly digital logic processes such as circuits based on emitter-coupled logic. Although pipelined adder circuits increased the speed by which the control word was added to the current count, the circuit was made even more complex, which increased cost.

In an effort to illustrate the digital logic equations required to implement such a general purpose accumulator, such as accumulator 4, a Cypress Inc. WARP2 VHDL (very high speed integrated circuit Hardware Descriptor Language) compiler, Version 4.2, was used. This generated the necessary logic equations for a 24-bit accumulator which added a 24-bit input value N[23:0] to a current input D[23:0] on a rising edge of the clock signal. The following code illustrates the VHDL statements necessary to specify a 24-bit accumulator.

```
library ieee;
use ieee.std_logic_1164.all;
use work.std_arith.all;
entity countby_N is port (
    clock: in std_logic;
    N: in std_logic_vector (23 downto 0);
    D: buffer std_logic_vector (23 downto 0));
end countby_N;
architecture DDS of countby_N is begin
    accumulator: process (clock)
    begin
        if (clock' event and clock='1') then
        D<=D+N;
        end if;
        end process accumulator;
end DDS.
```

Utilizing the aforementioned code, the VHDL compiler synthesized a 24-bit accumulator. The equations of twenty-four outputs D[23:0] are shown in Appendix A, attached hereto. The resulting logic, targeted for a Cypress Incorporated Programmable Logic (CIPL) device, contained 128 macrocells and 640 product terms. Macrocells and product terms are common measures of complexity used to characterize complex programmable logic devices. When optimized for fastest circuit speed, 55 of the 128 macrocells were required; 210 of the 640 unique product terms were required; and the maximum clock speed was 52.6 Mhz. When optimized for the smallest circuit area, 55 of the 128 macrocells were required; 165 of the 640 unique product terms were required; and the maximum clock speed was 14.5 Mhz.

Thus, an accumulator-based DDS, even if optimized for speed or size, is still slow and complex. Further, when optimized for speed, it is extremely complex and when optimized for size, it is extremely slow. Accordingly, a better DDS is needed.

SUMMARY OF THE INVENTION

An improved direct digital synthesizer simplifies digital circuitry required by utilizing an adder which counts by a predetermined fixed increment (count by C counter). Such a counter is preferably designed using a non-volatile reconfigurable complex programmable logic device (CPLD) IC. A digital circuit configuration is designed to count only at the required increment loaded into the CPLD. Such a specified increment counter provides for a DDS which operates at a much higher frequency than comparable DDS utilizing a general purpose accumulator.

BRIEF DESCRIPTION OF THE DRAWINGS

The features, aspects and advantages of the present invention will become better understood with regard to the following description, appended claims and accompanying drawings wherein like reference numerals represent like elements and wherein:

DETAILED DESCRIPTION OF THE PRESENT INVENTION

Figure 1:
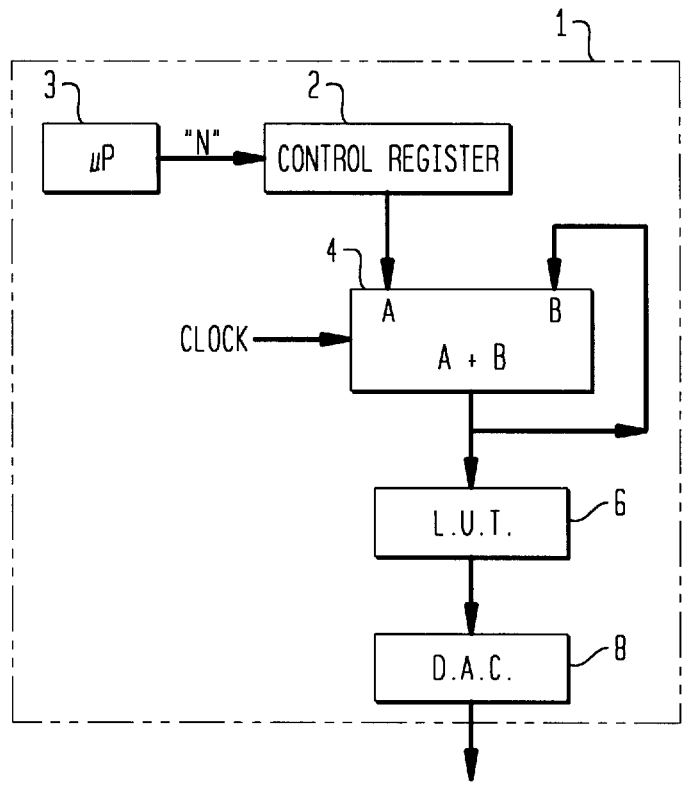
FIG. 1 illustrates a known direct digital synthesizer.
Figure 2:
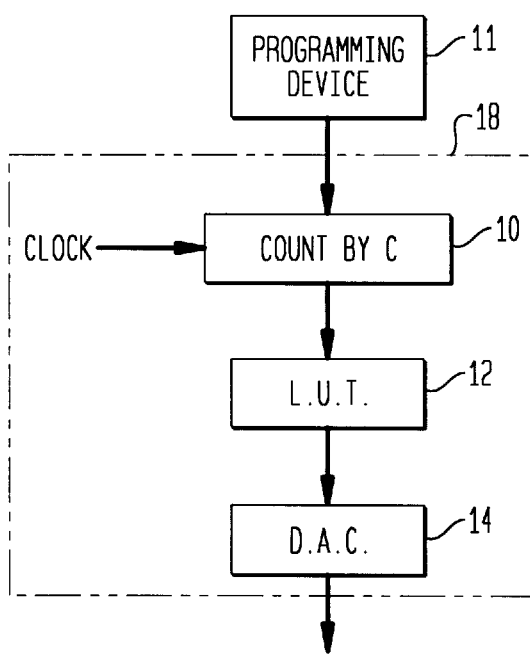
FIG. 2 illustrates a direct digital synthesizer utilizing a count-by-C counter of a preferred embodiment of the present invention.

The present invention is directed to a digital synthesizer 18 of FIG. 2, and preferably a direct digital synthesizer which can operate at a very high frequency. As shown in FIG. 2, the digital synthesizer 18 includes a counter 10, which, upon receiving a clock input, counts by a predetermined fixed increment "C" (wherein "C" is an integer); a memory 12, such as a programmable read only memory (PROM), which stores and outputs digital waveform values upon receiving an input from the counter 10; and a digital-to-analog converter 14 which converts the digital waveform values output from the memory 12 into an analog waveform.

Preferably, the counter 10 is a non-volatile reconfigurable complex programmable logic device (CPLD) IC. A programming device 11, external to the direct digital synthesizer 18 and capable of incrementing by the predetermined fixed increment "C", preferably loads the circuit configuration of the counter 10 of the digital synthesizer 18. Such a counter 10 operates at a much higher frequency than a general purpose adder.

In an effort to illustrate the advantages of the digital synthesizer 18 shown in FIG. 2, a Cypress Inc. WARP 2 VHDL compiler, Version 4.2, was used to generate logic equations for the 24-bit counter 10, counting by a fixed increment of 13,981,013 (decimal), used as an exemplary fixed increment. Any fixed increment can be used and the specific fixed increment discussed herein should be considered limitative of the present invention in any way. Further, the counter 10 being a 24-bit counter is also exemplary as any appropriate size counter counting by any fixed increment can be used.

The following code is all that is required:
-- Count__by__C is a 24-bit counter that counts by a fixed number C. --
library ieee;
use ieee.std__logic__1164.all;
use work.std__arith.all;
entity countby__C is port (
  Clock: in std__logic;
  D: buffer std__logic__vector (23 downto 0));
constant C: std__logic__vector (23 downto 0): =b"
  110101010101010101010101;
-- 110101010101010101010101 (binary) equals 13,981,013 decimal.
end count by__C;
architecture DDS of countby__C is
begin
  accumulator: process (clock)
  begin
    if (clock' event and clock='1') then
    D<=D+C;
    end if;
    end process accumulator;
end DDS.

Utilizing the aforementioned code, the VHDL compiler synthesized a 24-bit count-by-C counter 10 which counts by 13,981,013, determined to create the most complex logic equations for a 24-bit output and thus representing a "worst case" for comparison to the equations for the general purpose accumulator. This worst case C value was determined by a computer program in which every possible 24-bit value of C was tried. The equations for D[23:0] are shown in Appendix B. These logic equations illustrate the advantages in terms of circuit size and speed of utilizing a count-by-C counter 10 in a digital synthesizer 18. The resulting logic was targeted for a CIPL device. A summary of the resources used are presented here.

For this case of C=13,981,013, the compiler produced the following results, which were the same irrespective of whether it was set to optimize for fastest speed or for smallest circuit area:

|  | Required | Max (Available) |
| --- | --- | --- |
| Macrocells Used | 24 | 128 |
| Unique Product Terms | 155 | 640 |
| Maximum Clock Speed (Mhz) | 125.0 |  |

Further, the design utilizing the count-by-C counter 10 requires fewer input pins than the standard accumulator 4, and can be fit into a smaller/cheaper/and faster CPLD, having a maximum clock speed of 143.0 Mhz.

The following discussion provides a logical basis for the speed advantage provided by the architecture using a count-by-C counter 10. When two binary numbers are added such as:

01111 (15)
+00001 (+1)
10000(=16)

a bit in the sum changing or "toggling" from a "1" to a "0", or from a "0" to a "1" is dependent upon all of the less significant bits of both numbers being added. The "0" in the left-most position of the top number (01111) toggles to a "1" due to the state of the four right-most bits of the top number (1111), and the four right-most bits of the second number (0001). Thus, in the design of a general purpose accumulator 4 circuit, the equation for the left-most bit would include the state of all of those eight bits.

In a count-by-C counter 10, however, whether a bit toggles is dependent only upon the less significant bits of the current sum alone. In the example above, for the case where C=1, any bit position toggles if all of the lower order bits equal 1. For any value of C, a set of equations is found for the count-by-C counter 10 that are always simpler than the general purpose accumulator 4 for the same number of bits.

As another illustration of the simplification made possible by counting by a predetermined fixed increment (using a count-by-C counter 10), if the binary value of C contains a number of trailing O's (e.g. C=240 decimal or 11110000 binary), no equations are required for the lowest 4 bits since they never effect the output sum. Thus, the number of equations is reduced using the count-by-C counter 10 in the direct digital synthesizer 18 of the present invention and thus speed is increased and size is reduced.

Generating the Count-By-C Equations

The equations for each bit of the output sum are a function of the value of C. As seen in the equations in the Appendices A and B, the equations generally take the form:

$$D[x].T=D[\#]*D[\#]*D[\#]*D[\#]*D[\#]*D[\#]+D[\#]*D[\#]*D[\#]$$

Other product terms here $$+D[x-1]$$

where D[x] is any of the output bits with x=0 to 23 for a 24-bit output sum. The "#" is any less significant bit position. The "T" indicates that when the conditions of the equation are met, the output bit will toggle to the other binary state. The "*" is the AND operator. Bits AND'ed together form what is known as a product term. The "+" is the OR operator. A list of product terms OR'ed together are in the "sum of products" form. The equation states that the Bit[x] will toggle if all the bits specified in the first line are set to "1", OR if the bits specified in the second line are set to "1", OR if Bit[x−1] is set to "1".

The equations for a count-by-C counter 10 are generated by the following two rules.

if $C[x]=1, D[x]$ should toggle if $D[(x-1):0]<2^x-C[(x-1):0]$. (1)

if $C[x]=0, D[x]$ should toggle if $D[(x-1):0]>=2^x-C[(x-1):0]$. (2)

In an effort to illustrate how the value of C determines the equation sets, a value of 41, for example, is used for C. This value of C is represented in binary with 8 bits C[7:0] as 00101001 (32+8+1=41(decimal)). The equation for any particular bit of the output D[7:0] is found by finding the sum of product terms that satisfy one of the above equations (1) or (2).

Using D[7] to illustrate the process, "x" has the value of 7. Since C[7]=0, the second equation (2) is used. The set of sum of product terms which identify whether or not output bits $D[6:0]>=2^x-C[6:0]$, must be found. $2^7-C[6:0]$ is equal to 87, or 1010111 in binary notation.

The first product term, equation (1), includes terms of D which are set to 1 (bits 6,4,2,1,0). The next product term is found by scanning right to left, identifying the right-most bit set to a 0, and setting this to 1. The bits to the right of this bit are now considered irrelevant and are replaced with x's. The second product term is written again including terms of D which are set to 1 (1011xxx). Continuing this process again yields 11xxxxx which gives the final product term.

$$D[7].T=D[6]*D[4]*D[2]*D[1]*D[0]+D[6]*D[4]*D[3]+D[6]*D[5]$$

Considering another case where the C[x]=1, such as the equations for bit D[x] when x=5, the first equation (1) D[4:0]<$2^5$−C[4:0] must be satisfied. $2^5$−C[4:0] is equal to 23, so the equations for D[5] must contain product terms which identify that D[4:0] is less than 23, which is 10111 in binary. To find this set of equations, it is convenient to write the binary value of bits [4:0] as minus (−)23, which is 01001. Following the same process as before, the terms of D are found which contain bits set to 1. Then scanning to the left takes place looking for the first 0. This first 0 is then replaced with a 1 and the lesser bits are set to x. This process yields this sequence: 01001, 0101x, 011xx, 1xxxx. For this >= inequality, a / must be placed before each term to indicate that the D term must be a 0 to satisfy the equation.

$$D[5].T=/D[3]*/D[0]+/D[3]*/D[1]+/D[3]*/D[2]+/D[4]$$

Every term not included can be either a 0 or 1.

To verify that these equations identify that D[4:0] is less than 23, all of the values which satisfy the sum-of-product terms are tabulated. By inspection, all values of D[4:0] less than 23 are identified by the above sum-of-product terms.

| D [4] | D [3] | D [2] | D [1] | D [0] | Values obtained by replacing x with 0 and 1 |
|---|---|---|---|---|---|
| x | 0 | x | x | 0 | 0,2,4,6,16,18,20,22 |
| x | 0 | x | 0 | x | 0,1,4,5,16,17,20,21 |
| x | 0 | 0 | x | x | 0,1,2,3,16,17,18,19 |
| 0 | x | x | x | x | 0,1,2,3,4,5,6,7,8,9, 10,11,12,13,14,15,10, 11,12,13,14,15 |

Accordingly, utilizing a count-by-C counter 10 in the digital synthesizer 18, no equations are written for bit positions of lesser significance than the lowest significant set bit in C. If C=11110000, no equations are generated for bits D[3:0] (the last 4 bits). Thus less equations are used, and speed is increased. This is born out by the equations (1) and (2). For example, C[3]=0,D[3] should toggle if D[2:0]>= $2^3$−C[2:0], which equates to if D[2:0]>=8. This can never be true. In addition, the equation for D[4] (or whichever is the first bit set position set in C) should read D[4].T=1. Thus, D[4] should always toggle. C[4]=1,D[4] should toggle if D[D:0]<$2^4$−C[3:0], which equates to if D[3:0]<16. This is always true. The Warp2 compiler used to generate the equations in the appendices A and B writes this equation as D[4].D=D/D[4], which has the same meaning.

Applications for the Count-By-C Digital Synthesizer

Figure 3:
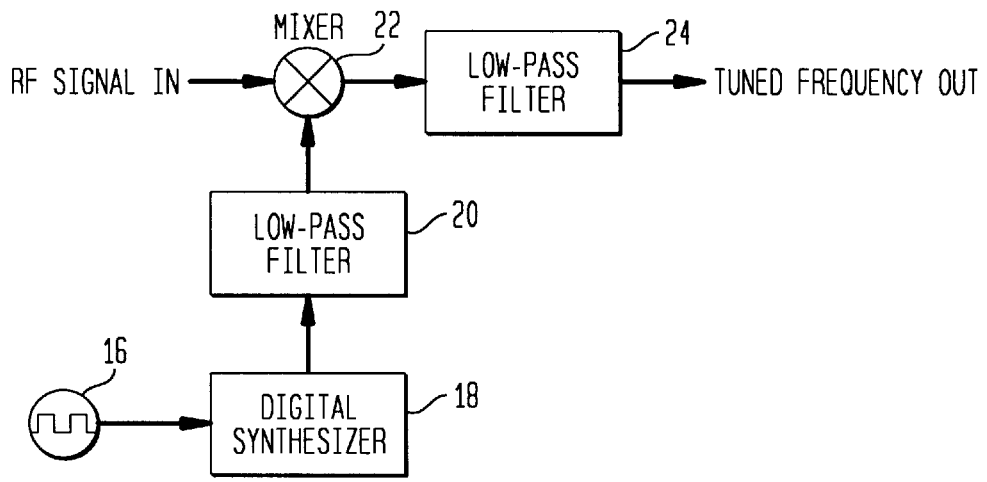
FIG. 3 illustrates a signal extracting circuit of another preferred embodiment of the present invention.

In a further preferred embodiment, the count-by-C type digital synthesizer 18 is used for extracting predetermined information from an input signal. As shown in FIG. 3, clock 16 generates a clock frequency for input to the digital synthesizer 18. The digital synthesizer 18, connected to low-pass filter 20, generates a precise frequency signal for input to mixer 22. Mixer 22 mixes the signal from low-pass filter 20 with an input radio frequency (RF) signal, for example, to extract desired information from the input RF signal, namely a predetermined portion of the input RF signal. After output through a low-pass filter 24, a desired signal is extracted. Operation of the device as shown in FIG. 3 is as follows.

A precise signal, such as a signal 49.97 MHz for example, is generated utilizing clock 16, digital synthesizer 18, and low-pass filter 20, and is input to mixer 22. The input RF signal is mixed with this signal to produce a signal spectrum which contains sum and difference frequencies, as well as other frequency byproducts. For example, if a 30 KHz bandwidth signal is present on a 50 MHz carrier of the RF signal input, and this signal is mixed with the precise 49.97 MHz signal necessary to extract the predetermined or desired signal (50 MHz−30 KHz), and then filtered, the original or desired 30 KHz signal will be recovered from the output of low-pass filter 24. Preferably, the desired 30 KHz signal is embodied in a carrier wave of the input RF signal. By setting the mixing frequency utilizing digital synthesizer 18, the mixer 22 is tuned to extract the desired signal over a wide range of frequencies.

Figure 4:
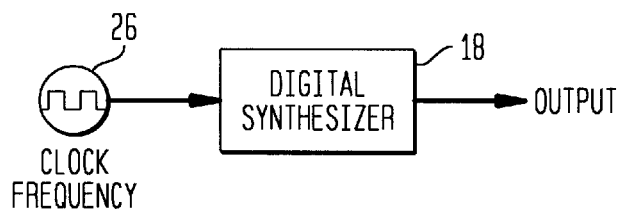
FIG. 4 illustrates a clock generation circuit of another preferred embodiment of the present invention.

In a further preferred embodiment as shown in FIG. 4, the count-by-C type digital synthesizer 18 of the present application is utilized to generate a programmable low frequency clock with precise control. A high frequency clock source is input from an external source, such as oscillator component 26. The count-by-C digital synthesizer 18 then receives this clock signal and generates an output signal connected to the most significant bit of the counter 10 output.

To illustrate the utility of this technique, assuming a 333 Hz clock (for example) is required to be derived from an external clock which may be inaccurate. For example, if the clock source (oscillator component 26) is nominally 20 MHz, but is measured in one instance to be 20.2 MHz, an accurate 333 Hz output clock can still be generated. Using a 36-bit count-by-C implementation (36-bit count-by-C counter 10) of digital synthesizer 18, C is calculated as $(2^{36}*333)/20200000=1,132,851$.

```
library ieee;
use ieee.std_logic_1164.all;
use work.std_arith.all;
entity square_wave is port (
    clock: in std_logic;
    count_out: buffer std_logic);
end square_wave;
architecture NCO of square_wave is signal counter:
    std_logic_vector (35 downto 0);
    begin
    accumulator: process (clock)
    begin
    if (clock' event and clock='1') then
        begin
        counter<=counter+1132851;
        end if;
    end process accumulator;
    count_out<=counter(35);
end NCO;
```

Since the process of generating the configuration file is automated through the WARP2 development software, it is possible to generate the required CPLD programming file on-demand for any particular value of C required to obtain the desired frequency and accommodate a loosely specified external clock. If an accurate, precision-grade oscillator is used as the external clock 26 to clock the CPLD of count-by-C digital synthesizer 18, then CPLD configuration files with file names that denote the output frequency can be stockpiled and loaded as necessary to obtain a desired output frequency.

In yet a further preferred embodiment, the digital synthesizer 18 of the present application is used as a component of a frequency shift keying (FSK) modulator 32. This is shown in FIG. 5.

More specifically, the FSK modulator 32 includes a clock 30 for generating a clock frequency signal and a digital synthesizer 18, receiving the clock frequency signal to clock the count-by-C counter 10 thereof.

Figure 5:
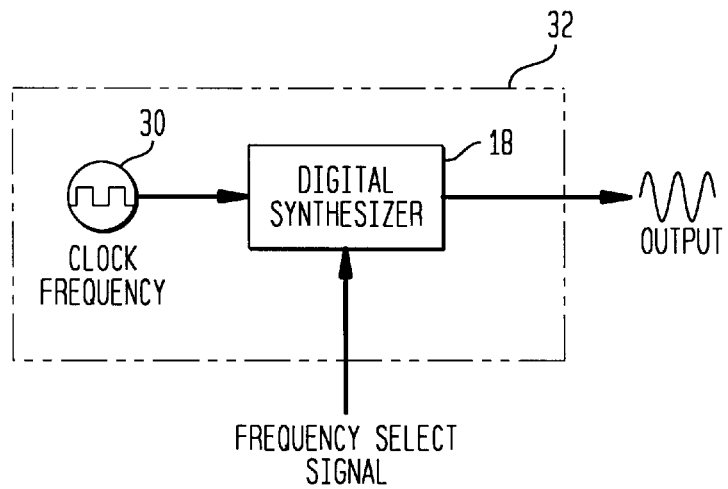
FIG. 5 illustrates another preferred embodiment of the present invention wherein the direct digital synthesizer is used as a component of an FSK modulator.

The digital synthesizer 18 further receives an input frequency select signal as shown in FIG. 5. The frequency select signal is one of two distinct signals (or one of a plurality of distinct signals), such as a relatively high frequency or relatively low frequency signal, each of which triggers the count-by-C counter 10 to count by one of two predetermined fixed increments, C1 or C2 (or one of a plurality of predetermined fixed distinct increments). This in turn causes digital synthesizer 18 to generate an output signal of one of two (or a plurality of) distinct frequencies, thereby providing an output of FSK modulator 32.

The use of the count-by-C type digital synthesizer 18 provides an output of FSK modulator 32 which smoothly transitions between the signals of two (or a plurality of) frequencies. In other words, using the digital synthesizer 18, the FSK modulator 32 easily transitions between signals of two or more frequencies without phase discontinuities.

Utilizing digital synthesizer 18, a VHDL code is easily converted to permit signals one of two (or more) frequencies to be output from FSK modulator 32, controlled by an input frequency select signal. This section of VHDL code illustrates how this can be accomplished to produce an output signal of FSK modulator 32 alternating between two frequencies (for example) utilizing a 100 MHz clock (for example), noting that one exemplary constant C1 is 167772 or $2^{24}/10$ and the other exemplary constant C2 is 83886 or $2^{24}/20$:

```
library ieee;
use ieee.std_logic_1164.all;
use work.std_arith.all;
entity countby_C is port (
    clock: in std_logic;
    F_select: in std_logic;
    count_out: buffer std_logic_vector (23 downto 0)
    constant C1: integer: =167772; -- Gives clock/10 output
        frequency.
    constant C2: integer: =083886; -- Gives clock/20 output
        frequency.
end countby_C;
architecture FSK of countby_C is
    begin
    accumulator: process (clock)
        begin
        if (clock' event and clock='1') then
        if (F_select='0') then
            count_out<=count_out+C1;
        else
            count_out<=count_out+C2;
            end if;
        end if;
        end process accumulator;
end FSK;
```

Figure 6:
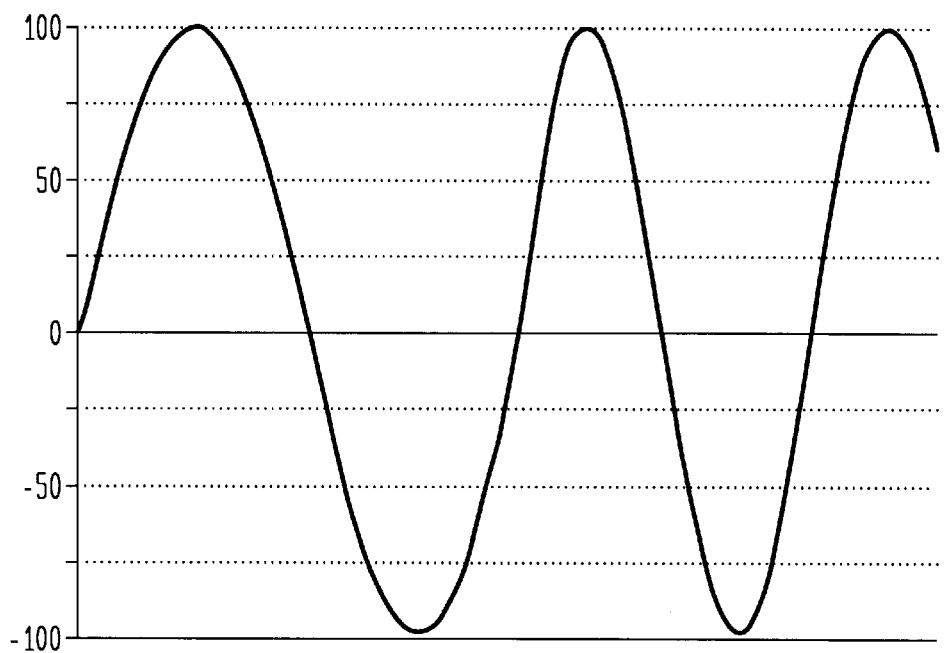
FIG. 6 illustrates a combined waveform output of the FSK modulator of FIG. 5.

Utilizing the digital synthesizer 18 as a component of FSK modulator 32, output selection between signals of two frequencies, or signals of a plurality of frequencies, occurs without any phase discontinuity. As is shown in FIG. 6, the output signal generated by FSK modulator 32 based upon an output signal selected between two frequencies avoids any phase discontinuity.

Figure 7:
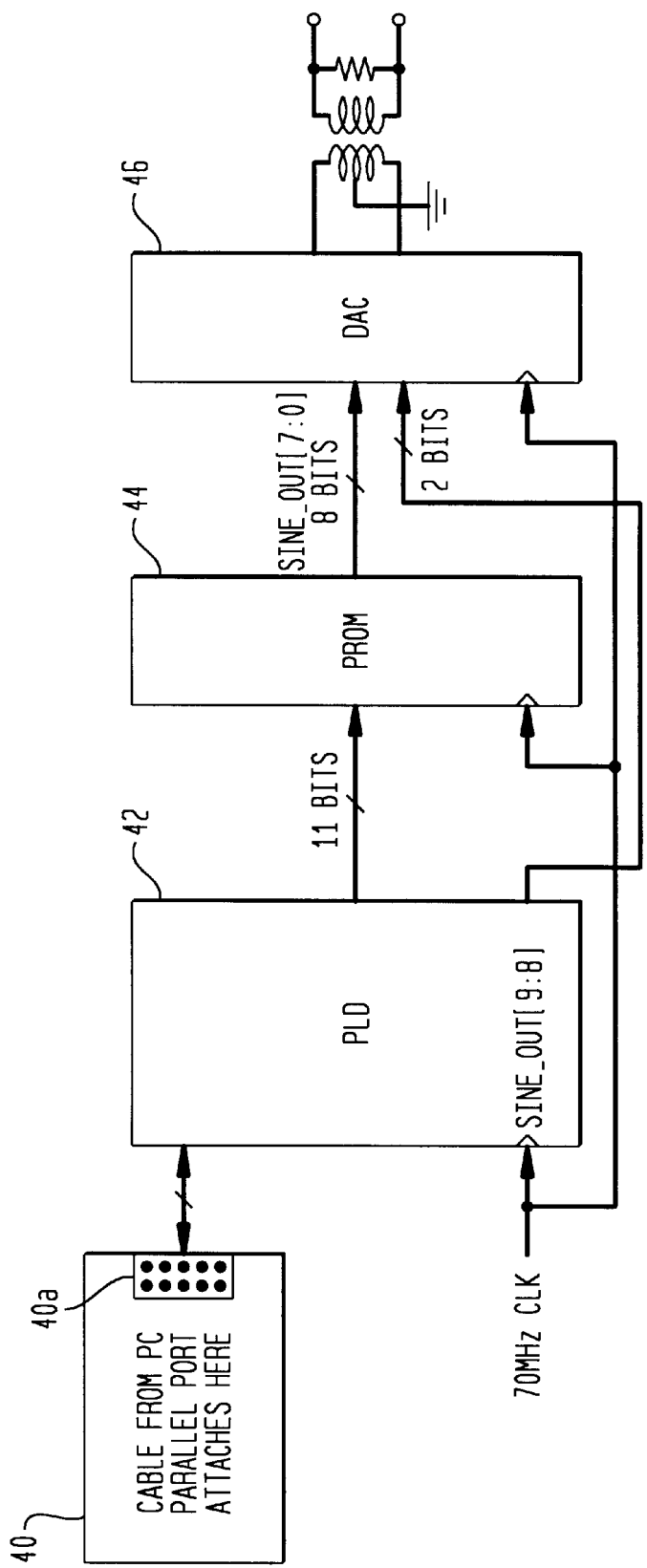
FIG. 7 illustrates a digital synthesizer of another preferred embodiment of the present invention utilizing an 8-bit PROM and a 10-bit DAC.
Figure 9:
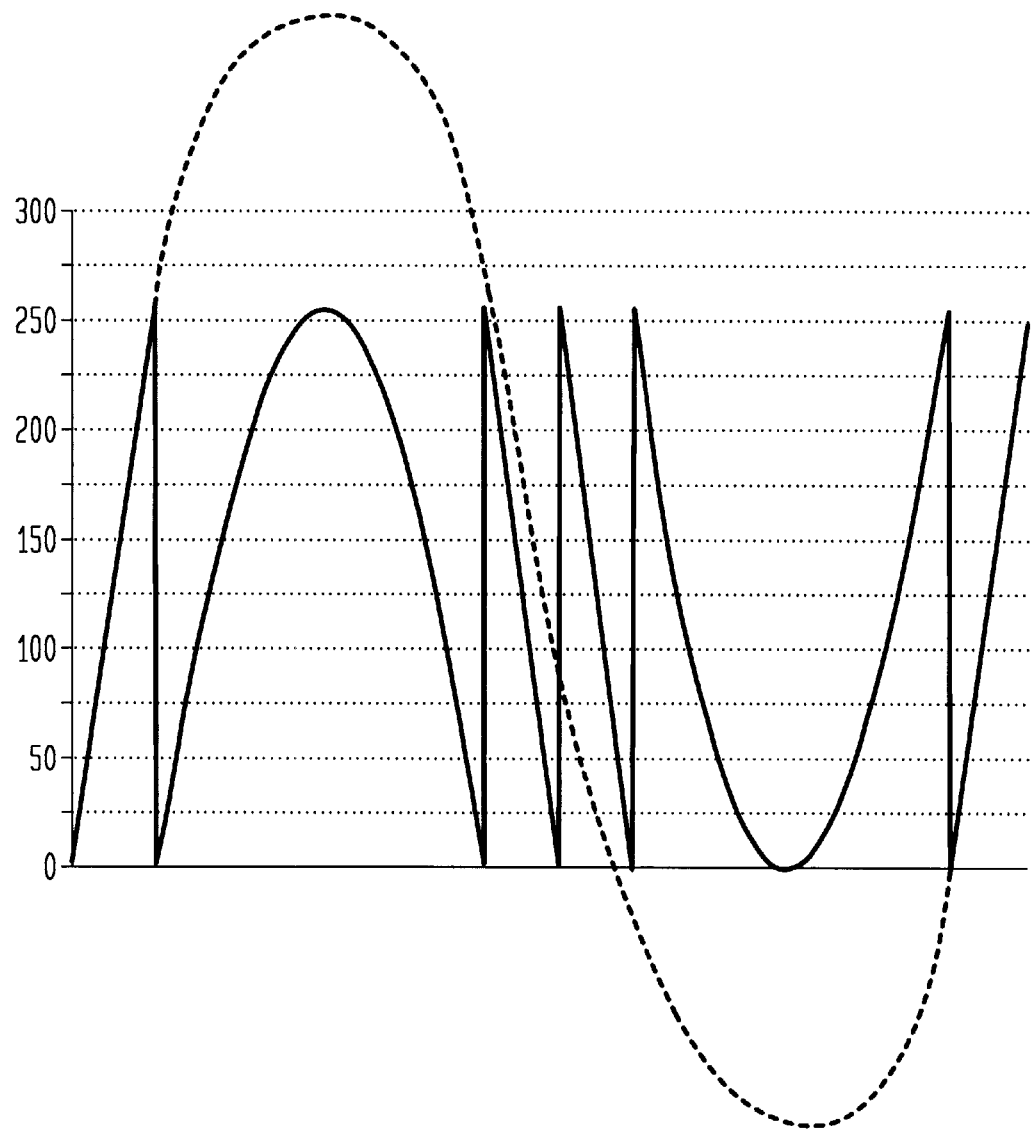
FIG. 9 illustrates the effective output of the 10-bit DAC of FIG. 7.

Finally, in another preferred embodiment as shown in FIG. 7, the digital synthesizer 18 of the present application is used with a single 8-bit memory, such as programmable read only memory (PROM) 44 and a 10-bit DAC 46. To create such a digital synthesizer as shown in FIG. 7 for example, a microprocessor 40 with a parallel port 40A, is connected to a programmable logic device (PLD) 42, used as a count-by-C counter 10. The PLD 42 connects to both the PROM 44 and to the DAC 46, with the DAC 46 receiving 8 bits of input from PROM 44 and 2 bits of input from PLD 42. A common clock, such as a 70 MHz clock, is used for each of the PLD 42 as a count-by-C counter 10, PROM 44, and DAC 46. Operation of the digital synthesizer utilizing the PLD 42, PROM 44, and the DAC 46 as shown in FIG. 7 will be explained as. follows.

Figure 8:
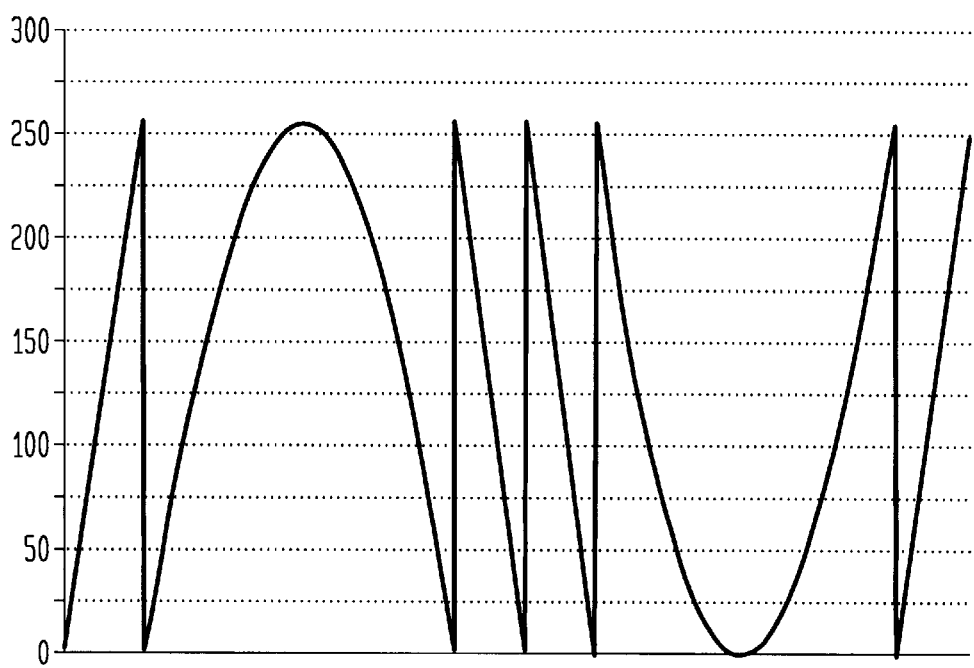
FIG. 8 illustrates information stored in the 8-bit PROM of FIG. 7.

Normally, in a digital synthesizer, a memory such as PROM 44 will store all of the components of a waveform to be generated, so that a digital representation of a sinewave (for example) can be output from the memory. However, in a digital synthesizer utilizing the components PLD 42, PROM 44, and DAC 46 as shown in FIG. 7, the PROM 44 is essentially an off-the-shelf PROM and as such, is an 8-bit device. Accordingly, the PROM 44 only stores the eight least significant bits (LSBs) of a waveform such as a sinewave. An analog representation of these eight LSBs of the sinewave are shown in FIG. 8 for example.

DAC 46 is a 10-bit device, since in many applications a 10-bit DAC is required for proper resolution. Thus, typically two 8-bit PROMs would be required to provide the 10 bits used by the 10-bit DAC 46, since a single PROM 44 stores only 8 bits. change at those.

Utilizing a PLD 42, programmed utilizing VHDL code as will be described hereafter, two outputs are used from PLD 42, in combination with the 8 bits of output from PROM 44, to provide the 10-bit output to DAC 46 to generate a complete sinewave signal. The PROM 44 outputs the eight LSBs of the sinewave, Sine_out [7:0] and the PLD 42 outputs the two most significant bits (MSBs), bits Sine_out [9:8]. The two most significant bits of the sinewave change at these angular values of the sinewave: 0°, 30°, 150°, 180°, 210° and 330°. The PLD 42 calculates which angle range it is outputting by evaluating the address output to the PROM 44 and sets bits sine_out [9:8] accordingly. The PROM 44 stores a pattern, as shown in FIG. 8 for example, wherein the MSBs are factored out.

The VHDL code, stored in PLD 42, is modified to create Sine_out [9] and Sine_out [8] as follows:

```
library ieee;
use ieee.std_logic_1164.all;
use work.std_arith.all;
entity dds is port (
    clock: in std_logic;
    sineout: out std_logic_vector(9 downto 8);
    EPROM_addr: buffer std_logic_vector(10 downto 0)
);
constant C: integer: =10000;
end dds;
architecture Countby_C of dds is begin
signal count: std_logic_vector (21 downto 0);
accumulator: process (reset, clock)
    begin
        if (clock' event and clock='1') then
            count<=count+C;
        end if;
    end process accumulator;
calc_sine_msb: process (count)
    begin
        if (count 10 downto 0)<=170) then sineout<="10";
        elsif (count(10 downto 0)>170) and (count(10 downto
            0)<=853) then sineout<="11";
        elsif (count(10 downto 0)>853) and (count(10 downto
            0)<=1024) then sineout<="10";
        elsif (count(10 downto 0)>1024) and (count(10 downto
            0)<=1195) then sineout<="01"'
        elsif (count (10 downto 0)>1195) and (count(10 downto
            0)<=1876) then sineout<="00";
        else sineout<="01";
        end if;
    end process calc_sine_msb;
    EPROM_addr(10 downto 0)<=count(21 downto 11);
end Countby_C;
```

As before, this VHDL code is translated by the WARP2 VHDL compiler (for example) to a CPLD configuration file which is loaded into the PLD 42 (as an exemplary way to download equations for the count-by-C counter 10).

Utilizing the circuit shown in FIG. 7, only a single 8-bit PROM 44 is utilized and thus a significant cost savings is achieved. Further, it should be noted that the technique is not limited to use with a 10-bit DAC 46, but could also be utilized to generate three or four address bits for use with an 11 or 12-bit DAC, for example. Preferably, the clock is a 70 Mhz clock, the PROM 44 is a 20 ns PROM, the DAC 46 is a 100 Mhz DAC, and the PLD 42 is a complex PLD (CPLD), receiving its programming from a microprocessor 40 of a personal computer (not shown).

Although the present invention has been described in considerable detail with reference to various applications for the digital synthesizer of the present application, it should be understood that the present invention is applicable to any device which utilizes precise frequencies as can be generated by the digital synthesizer of the present application. It should be readily apparent to one of ordinary skill in the art that the present invention is equally applicable to other digital synthesizer applications. Therefore, the spirit and scope of the present invention should not be limited to the description of the embodiments contained herein. It will be apparent that the invention described may be varied in many ways, and such variations are not to be regarded as a departure from the spirit and scope of the invention. All such modifications as would be obvious to one of ordinary skill in the art are intended to be included within the scope of the following claims.

I claim:

1. A digital synthesizer comprising:
    a counter, adapted to count by a predetermined fixed increment, the counter performing a count operation by toggling bits representative of a sum of a stored count value and the predetermined fixed increment based on at least one logic equation, the at least one logic equation being programmed based on the predetermined fixed increment;
    a memory, adapted to store and output digital waveform values upon receiving an input from the counter; and
    a digital-to-analog converter, adapted to convert the digital waveform values output from the memory into analog waveform values.

2. The digital synthesizer of claim 1, wherein the counter is a complex programmable logic device (CPLD).

3. The digital synthesizer of claim 1, wherein the predetermined fixed increment by which the counter counts is a predetermined integer.

4. The digital synthesizer of claim 1, wherein the memory includes a look-up table.

5. An apparatus comprising an oscillator, and the digital synthesizer of claim 1 for generating a programmable low-frequency clock signal.

6. A frequency selector comprising a digital synthesizer as set forth in claim 1, wherein the counter counts by different predetermined fixed increments depending upon an input selection signal received.

7. A frequency shift keying (FSK) modulator comprising the frequency selector of claim 6, wherein output signals of the digital synthesizer, generated dependent upon the input selection signal, are synthesized signals of varying frequencies.

8. A digital synthesizer, comprising:
counting means for counting by a predetermined fixed increment, the counting means performing a count operation by toggling bits representative of a sum of a stored count value and the predetermined fixed increment based on at least one logic equation, the at least one logic equation being programmed based on the predetermined fixed increment;
storage means for storing and outputting digital waveform values upon receiving an input count from the counting means; and
converting means for converting the digital waveforms output from the memory means into analog waveform values.

9. The digital synthesizer of claim 8, wherein the counting means includes a complex programmable logic device (CPLD).

10. The digital synthesizer of claim 8, wherein the storage means includes a look-up table (L.U.T.).

11. The digital synthesizer of claim 8, wherein the converting means includes a digital-to-analog converter.

12. A frequency selector comprising a digital synthesizer as set forth in claim 8, wherein the counting means counts by different predetermined fixed increments depending upon an input selection signal received.

13. A frequency shift keying (FSK) modulator comprising the frequency selector of claim 12, wherein outputs from the digital synthesizer, generated dependent upon the input selection signal, are synthesized signals of varying frequencies.

14. An apparatus comprising an oscillator and the digital synthesizer of claim 8 for generating a precise frequency signal.

15. A signal extracting device comprising:
a digital synthesizer comprising:
a counter, adapted to count by a predetermined fixed increment,
a memory, adapted to store and output digital waveform values upon receiving an input from the counter, and
a digital-to-analog converter, adapted to convert the digital waveform values output from the memory into analog waveform values;
a mixing circuit, adapted to mix a received input signal with the analog output signal from the digital synthesizer; and
a filter, adapted to filter an output received from the mixing circuit to recover a predetermined portion of the received input signal.

16. The signal extracting device of claim 15, wherein the predetermined portion of the input signal is embodied in a carrier wave signal.

17. The signal extracting device of claim 16, wherein the analog output signal is a precise signal equating to a difference between the carrier wave and the predetermined portion of the input signal.

18. A signal extracting device comprising:
a digital synthesizer, comprising:
counting means for counting by a predetermined fixed increment,
storage means for storing and outputting digital waveform values upon receiving an input count from the counting means, and
converting means for converting the digital waveforms output from the memory means into analog waveform values;
mixing means for mixing a received input signal with the analog output signal from the digital synthesizer; and
filtering means for filtering an output received from the oscillating means to recover a predetermined portion of the input signal.

19. The signal extracting device of claim 18, wherein the predetermined portion of the input signal is embodied in a carrier wave signal.

20. The signal extracting device of claim 19, wherein the analog output signal is a precise signal equating to a difference between the carrier and the predetermined portion of the input signal.

21. A synthesizer comprising:
a counter, adapted to count by a predetermined fixed increment, the counter performing a count operation by toggling bits representative of a sum of a stored count value and the predetermined fixed increment based on at least one logic equation, the at least one logic equation being programmed based on the predetermined fixed increment;
a memory, connected to the counter, adapted to store and output digital waveform values upon receiving an input from the counter; and
a digital-to-analog converter, connected to the counter and the memory, adapted to combine the received digital waveform values with an input received from the counter to create an output analog waveform.

22. The synthesizer of claim 21, wherein the digital-to-analog converter receives a plurality of bits from the memory and a plurality of bits from the counter.

23. The synthesizer of claim 22, wherein two (2) bits received from the counter are the most significant bits.

24. The synthesizer of claim 22, wherein the digital-to-analog converter receives eight (8) bits from the memory and two (2) bits from the counter.

25. The synthesizer of claim 21, wherein the memory is an eight (8) bit programmable read only memory (PROM).

26. The synthesizer of claim 21, wherein the digital-to-analog converter (DAC) is a ten (10) bit DAC.

27. The synthesizer of claim 21, wherein the digital-to-analog converter (DAC) is a twelve (12) bit DAC.

28. The synthesizer of claim 25, wherein the digital-to-analog converter (DAC) is a ten (10) bit DAC.

29. The synthesizer of claim 25, wherein the digital-to-analog converter (DAC) is a twelve (12) bit DAC.

* * * * *